United States Patent [19]

Asam et al.

[11] 4,114,980
[45] Sep. 19, 1978

[54] LOW LOSS MULTILAYER OPTICAL FIBER

[75] Inventors: Adolf R. Asam, Daleville; Mokhtar S. Maklad, Roanoke, both of Va.

[73] Assignee: International Telephone and Telegraph Corporation, Nutley, N.J.

[21] Appl. No.: 685,198

[22] Filed: May 10, 1976

[51] Int. Cl.² .............................................. G02B 5/14
[52] U.S. Cl. .................................. 350/96.33; 65/3 A; 350/96.34
[58] Field of Search ........... 350/96 R, 96 M, 96 WM, 350/96.29, 96.30, 96.31, 96.32, 96.33, 96.34; 65/3 A

[56] References Cited

U.S. PATENT DOCUMENTS

| | | | |
|---|---|---|---|
| 3,791,714 | 2/1974 | Maurer | 350/96 WG |
| 3,853,384 | 12/1974 | Pinnow et al. | 350/96 WG |
| 3,884,550 | 5/1975 | Maurer et al. | 350/96 WG |
| 3,932,160 | 1/1976 | Camlibel et al. | 65/3 A |
| 3,957,474 | 5/1976 | Kobayashi et al. | 65/3 A |
| 3,963,468 | 6/1976 | Jaeger et al. | 350/96 GN X |
| 4,009,014 | 2/1977 | Black et al. | 65/3 A |

OTHER PUBLICATIONS

Payne et al., "A Borosilicate-Cladded Phosphosilicate-Core Optical Fibre," *Optics Communications,* vol. 13, No. 4, Apr. 1975, pp. 422-425.
Presby et al., "Material Structure of Germanium-Doped Optical Fibers...", *Bell Syst. Tech. Journal,* vol. 54, No. 10, Dec. 1975, pp. 1681-1692.
Payne et al., "Preparation of Water-Free Silica-Based Optical Fiber Waveguide," *Elec. Letters,* vol. 10, No. 16, Aug. 8, 1974, pp. 335-336.

*Primary Examiner*—John K. Corbin
*Assistant Examiner*—John D. Lee
*Attorney, Agent, or Firm*—John T. O'Halloran; Peter C. Van Der Sluys

[57] ABSTRACT

A low loss multilayer optical fiber having good transmission properties in the infrared region of the spectrum is produced by depositing the core and cladding materials on the inner surface of a collapsible silica tube in the absence of moisture. A barrier layer is interposed between the silica tube and the cladding to prevent the migration of OH and transition metal ions during the tube collapsing and fiber drawing processes.

8 Claims, 4 Drawing Figures

LOW LOSS MULTILAYER OPTICAL FIBER

BACKGROUND OF THE INVENTION

Various methods are known for producing low loss optical fibers for light sources emitting in the visible region of the electromagnetic spectrum. One such method is described, for example, in U.S. Pat. No. 3,884,550 issued to R. Maurer et al. The patent teaches the method of depositing high purity germania and silica by means of flame hydrolysis. The fiber exhibits good light transmitting properties over the visible region of the electromagnetic spectrum but exhibits strong attenuation in the vicinity of 0.95 $\mu$ in the infrared region.

U.S. Application Ser. No. 367,287 filed June 5, 1973 and assigned to the common assignee of the instant invention abandoned in favor of continuation Application Ser. No. 510,927 filed Oct. 1, 1974 in turn abandoned in favor of continuation Application Ser. No. 696,991 filed June 17, 1976. Recognized that the absorption at 0.95 $\mu$ was due to OH ions present in the fiber material of Maurer et al. The OH ions possibly resulted from water generated by the flame hydrolysis method of application of the core and cladding materials. The aforementioned U.S. application in an attempt to reduce the quantity of OH ions present in the fiber deposited the core and cladding materials in the absence of moisture by chemical vapor deposition within a carefully outgassed enclosure tube. The flame contributing to the thermal decomposition of the core and cladding materials was not allowed to contact these materials due to the interposition of the aforementioned tube. The dissociation of the core and cladding materials in the absence of moisture greatly reduced the quantity of OH ions in the finished fiber and diminished the absorption loss at 0.95 $\mu$.

With the continued improvements in the rated life of GaAs lasers the use of lasers as light sources in optical communications systems is also increasing. Since GaAs lasers principally emit in the infrared region of the electromagnetic spectrum, the absence of any absorption in the infrared region would greatly improve the overall optical communication efficiency.

The purpose of this invention is to provide methods and materials for producing optical fibers having substantially improved light transmission in the infrared region.

SUMMARY OF THE INVENTION

Optical communication fibers are produced by the thermal dissociation of germanium, boron and silicon halides within a carefully outgassed silica tube. Cations are excluded from the resulting fiber by the selection of spectroscopically pure materials in order to provide low loss in the visible region of the electromagnetic spectrum. Anions are excluded from the resulting optical fiber by the deposition of the materials in the absence of moisture and further by the interposition of an ion barrier layer between the silica tube and the resulting core and cladding materials. The barrier layer interface prevents the diffusion of OH and transition metal ions from the silica tube during both the vapor deposition and fiber drawing processes.

DESCRIPTION OF THE PREFERRED EMBODIMENT

Figure 1:
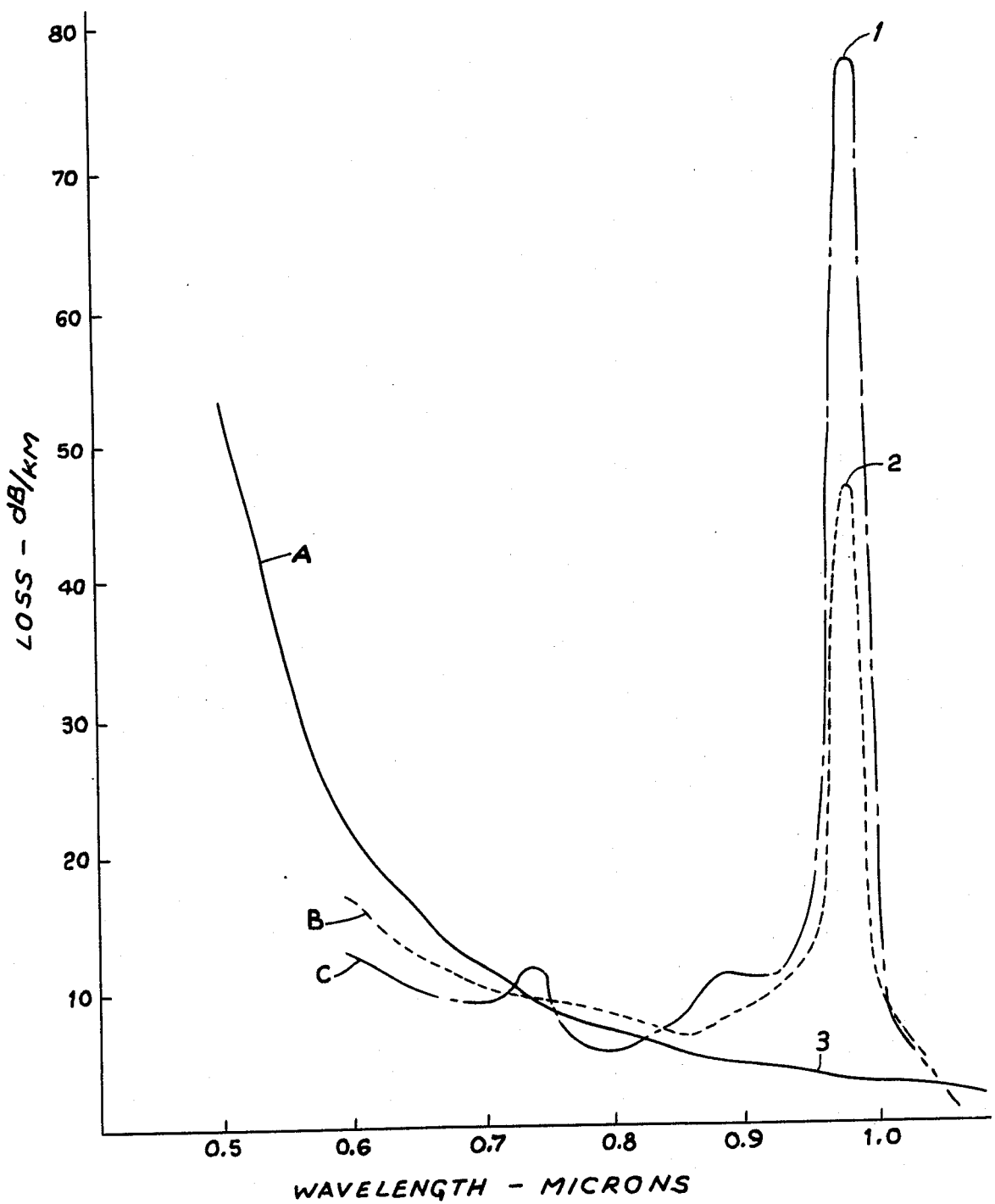
FIG. 1 is a graphic representation of the loss in energy at various optical wavelengths for the optical fiber of this invention and for two prior art optical fibers.

FIG. 1 shows the loss profile C of an optical communications fiber having a doped germania core and a silica cladding made by the method of flame hydrolysis. The loss for this fiber at 0.95 $\mu$ is indicated at 1 to be substantially higher than the loss at any of the other wavelengths indicated. This high absorption loss occurring at 0.95 $\mu$ is due to the presence of OH ions in the germania doped silica core and possibly due to the OH ions in the silica cladding when the resultant fiber is of such a geometry to promote some optical propagation within the cladding.

The loss profile B of an optical communications fiber having a germania doped silica core and a boron doped silica cladding formed by the thermal dissociation of silicon tetrachloride, germanium tetrachloride and boron trichloride shows less absorption loss at 0.95 $\mu$ as indicated at 2 than the loss of the fiber formed by the flame hydrolysis method as indicated at 1. The thermal dissociation of the core and cladding materials for the fiber having loss profile B is believed to result in hydrogen containing compounds which are produced within the flame by the method of flame hydrolysis. Further attempts to reduce the loss caused by the OH ions present in the fiber showed that the silica tubing used as a protective barrier to the flame used in the thermal dissociation of the core and cladding materials also contributed to the presence of hydrogen-containing compounds within the resulting fiber. Since the silica outer tubing generally contains some absorptive hydrogen compounds or OH groups when heated first during the thermal dissociation process and later during the fiber drawing process, these compounds and OH groups diffused into the OH free core and cladding and hence increase the attenuation at 0.95 $\mu$. Careful thermal outgassing of the silica tube prior to the thermal dissociation process decreased the measured loss at 0.95 $\mu$ but not to the extent that optical transmission was as efficient at 0.95 $\mu$ as throughout the visible spectrum.

Further attempts to reduce the absorption loss at 0.95 $\mu$ included the interposition of a barrier layer between the silica tube and the core and cladding materials. It was then discovered that when the barrier layer was of sufficient thickness OH ion diffusion from the outer silica tube could be prevented from entering into the core and cladding material. The loss profile A of an optical fiber having a 15.0 $\mu$ thick barrier layer interposed between the silica tube and the core and cladding materials resulted in the absorption at 0.95 $\mu$ indicated at 3. When the barrier layer was less than 15.0 $\mu$ the absorption loss was somewhat higher ranging between the values indicated in FIG. 1 at 2 and 3 depending upon thickness up to 15.0 $\mu$. An OH optical loss of less than 0.5 dB/Km at 0.95 $\mu$ was achieved.

Figure 2:
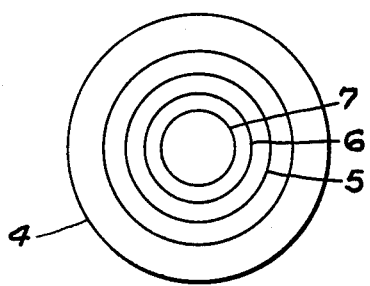
FIG. 2 is a cross-section of a coated silica tube according to this invention.

FIG. 2 is a cross-section of a silica tube 4 having a layer of pure silica 5 deposited by the aforementioned method of thermal dissociation of silicon tetrachloride in the absence of moisture. This was accomplished by connecting the silica tube 4 between the jaws of a horizontal glass lathe. Prior to the deposition of the silica layer 5 the silica tube 4 was thermally outgassed by attaching inlet and outlet vents and heating the tube 4 while passing dry oxygen through the tube via the inlet and exhausting the oxygen at the outlet. The dry oxygen flushing process was to insure that moisture outgassing from the interior of the silica tube 4 did not become reabsorbed during the outgassing process. After the outgassing process the pure silica layer 5 was deposited by introducing silicon tetrachloride vapor and heating the exterior of the silica tube 4 in order to dissociate the silicon tetrachloride in the presence of oxygen taking particular care to insure that no moisture is introduced during the process. When sufficient silica is deposited such that the silica layer 5 exceeds 15.0 $\mu$ then a pure borosilicate glass layer 6 is deposited by introducing boron trichloride vapor along with the silicon tetrachloride and dissociating both chlorides to form the borosilicate layer 6 in the presence of dry oxygen. The thickness of the borosilicate glass layer 6 depends upon the intended application of the resultant fiber. When single mode fibers are desired the borosilicate layer 6 is larger than, for example, when multimode fibers are desired. After the deposition of the borosilicate layer 6 a germania silicate layer 7 is produced by the simultaneous dissociation of germanium tetrachloride and silicon tetrachloride in the presence of dry oxygen. The thickness of the germania silicate layer 7 also depends upon the particular fiber desired and is larger for multimode than for single mode applications. Other materials can be used in combination with silica to form the inner layer 7 which ultimately forms the fiber core. $TiO_2$, $ZrO_2$, LaO, NbO, $Al_2O_3$, $Ta_2O_5$, SnO and $P_2O_5$ have all been used with varying degrees of success.

Figure 3:
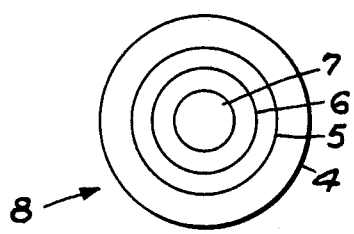
FIG. 3 is a cross-sectional view of the tube of FIG. 2 after collapsing into a preform.
Figure 4:
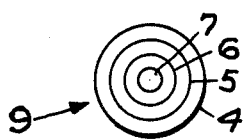
FIG. 4 is a cross-sectional view of an optical fiber drawn from the preform of FIG. 3.

After layers 5, 6 and 7 are deposted the silica tube 4 is collapsed to form the preform 8 depicted at FIG. 3 where the silica tube 4 forms an outer structural member for supporting the silica ion barrier layer 5, the borosilicate cladding layer 6 and the solid germania silicate core 7. The preform 8 having an overall diameter of approximately five sixteenths inch, when the silica tube 4 has an initial diameter of one inch, provides a useful, easily-handled structure for measuring the physical and optical characteristics of the ultimately produced optical fiber as depicted in FIG. 4.

The preform 8 is subsequently transferred to a vertical drawing tower where it is heated and drawn into a resulting fiber. When light of different wavelengths is transmitted through the fiber drawn from the preform 8 of FIG. 3 a loss profile is generated. This loss profile corresponds to the profile A shown in FIG. 1 having the loss indicated at 3 for 0.95 $\mu$ radiation.

Since several different glass compositions are required to provide the high numerical aperture fiber (N.A. $\geqq$ 0.35) of this invention various techniques were developed in order to prevent the coated tube from shattering due to the mismatch in the thermal expansion coefficients in the various glass layers. In order to overcome the strain developed during the coating process due to these variations in coefficients of thermal expansion a ribbon burner sufficiently long enough to heat the entire substrate was employed during the deposition and collapsing process. The ribbon burner functioned to keep the substrate temperature above the strain point in order to minimize the stresses developed between the deposited layers and the substrate. After the deposition and the collapsing of the substrate to form the preform, the ribbon burner is kept in operation for a period of time after the high temperature collapsing flame was extinguished to insure that the preform did not shatter during the cooling down processes. As the reacting gases flow in one direction, the deposited layer at the exhaust end is much thicker than that at intake end of the substrate, which is tapered. The stresses at exhaust end are high, and more likely to initiate crack propagation at this end. Placing a single burner at the exhaust end helps prevent the substrate from shattering. After collapsing the preform can be handled at room temperature with no special precautions.

For some optical fiber applications, such as when only a small quantity of the transmitted light enters the borosilicate cladding, the high purity silica barrier layer can be omitted and the thickness of the borosilicate layer increasd such that the borosilicate layer provides both cladding and ion barrier functions. For those applications where the electromagnetic field extends within the borosilicate cladding it was discovered that in the absence of the silica ion barrier layer the loss rate was due to the absorption of light within the cladding due to the presence of OH radicals.

Although the low loss optical fibers of this invention are described for application within optical communications systems, this is by way of example only. Fibers of this invention find application wherever low loss transmission in the infrared region may be required.

What is claimed is:

1. A low loss high numerical aperture optical communications fiber comprising:
   a core member consisting of a high refractive index material deposited in the absence of hydrogen;
   a cladding layer consisting of a lower index of refraction material deposited in the absence of hydrogen, said cladding layer surrounding said core member;
   a hydroxyl barrier layer surrounding said cladding layer to prevent hydroxyl ions from diffusing into said core and cladding; and an outer silica layer enclosing said barrier layer for providing structural support to the fiber.

2. The fiber of claim 1 wherein said barrier layer is deposited in the absence of hydrogen.

3. The fiber of claim 1 wherein the outer silica layer has a higher concentration of hydroxyl ions than said barrier layer.

4. The fiber of claim 1 wherein said barrier layer comprises silica deposited by the dissociation of silicon tetrachloride.

5. The fiber of claim 1 wherein said cladding layer comprises borosilicate deposited by the dissociation of silicon tetrachloride and boron trichloride.

6. The fiber of claim 1 wherein said core comprises germania silicate deposited by the dissociation of germanium tetrachloride and silicon tetrachloride.

7. The fiber of claim 1 wherein said barrier and cladding layers have a thickness of at least 15 microns.

8. The fiber of claim 1 wherein said numerical aperture $\geqq$ 0.35.